United States Patent [19]

Kenjesky

[11] 3,799,114

[45] Mar. 26, 1974

[54] EGG GUARD FOR POULTRY CAGES

[75] Inventor: Raymond J. Kenjesky, Holland, Mich.

[73] Assignee: U.S. Industries, Inc., New York, N.Y.

[22] Filed: Jan. 21, 1972

[21] Appl. No.: 219,752

[52] U.S. Cl. .................................. 119/17, 119/48
[51] Int. Cl. ............................................ A01k 31/14
[58] Field of Search ......................... 119/17, 18, 48

[56] References Cited
UNITED STATES PATENTS

| | | | |
|---|---|---|---|
| 3,552,359 | 1/1971 | Graves et al. | 119/48 |
| 3,485,214 | 12/1969 | Burkholder | 119/48 |
| 3,208,430 | 9/1965 | Ernst | 119/48 X |
| 2,827,014 | 3/1958 | Kaegebein | 119/48 |
| 3,498,267 | 3/1970 | Leeming | 119/48 X |
| 3,313,271 | 4/1967 | Graves | 119/48 |
| 3,626,906 | 12/1971 | Voran et al. | 119/48 |

FOREIGN PATENTS OR APPLICATIONS

| | | | |
|---|---|---|---|
| 445,449 | 4/1936 | Great Britain | 119/48 |

*Primary Examiner*—Louis G. Mancene
*Assistant Examiner*—James H. Czerwonky
*Attorney, Agent, or Firm*—Price, Heneveld, Huizenga & Cooper

[57] ABSTRACT

A one-piece guard preferably comprised of extruded plastic is positionable in a poultry cage and extends longitudinally thereof, generally perpendicular to the opposed end walls. The upper margin of the guard has a lip which extends outside the cage and fits over the upper edge of a feed trough for support while the shield portion within the cage has a support-receiving channel which receives a wire-like rod attached to the end walls and helps to support and position the guard within the cage. The shield portion within the cage is curved in its entirety as viewed from within the cage, and defines a reversing curvature which inhibits roosting on the guard by birds within the cage as well as the collection of moisture and dirt.

28 Claims, 3 Drawing Figures

PATENTED MAR 26 1974 3,799,114
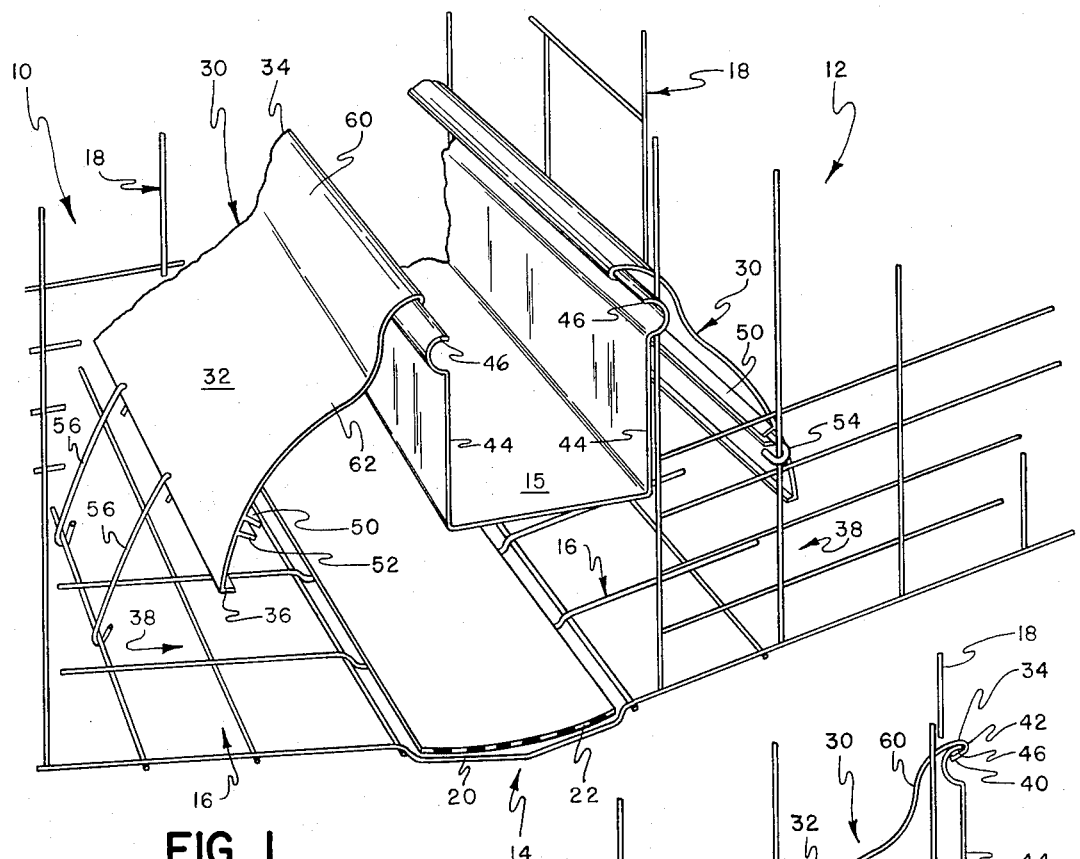
FIG. 1
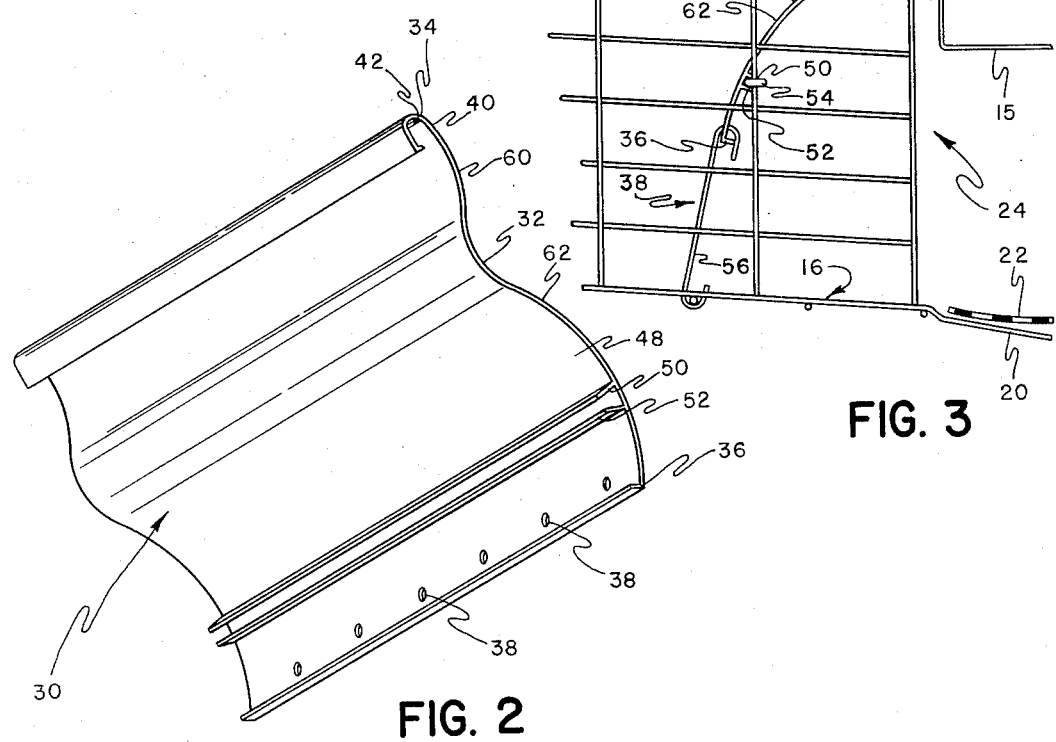
FIG. 2
FIG. 3

EGG GUARD FOR POULTRY CAGES

BACKGROUND OF THE INVENTION

The present invention relates to poultry cages, and is particularly directed to an improved egg guard for use in such cages.

Poultry cages used for egg-producing birds normally are elongated wire mesh structures having floors which are inclined toward one side (referred to herein for convenience as the "front" side) which terminates somewhat above the floor to provide a clearance space therebetween, through which eggs layed within the cages will roll outwardly of the cages and onto an egg-collection apparatus of one sort or another, normally a belt conveyor which is operated at certain times during the day to bring the eggs from the cages to a central collection area. Since the eggs are not instantaneously collected as they are layed, groups of eggs normally accumulate or congregate about the openings at the front of the cages between the various times when they are collected. For some time, it has been customary to utilize some form of egg guard in poultry cages by which the opening at the floor level along the front of the cage is somehow shielded. Although existing egg guards in the past have reduced outright breakage, damage in the form of "pinholing" continues to be a problem.

One of the major causes and effects of pinholing has only recently been discovered, and this is discussed in U.S. Pat. No. 3,626,906 assigned to the assignee herein and corresponding to application Ser. No. 692,841, filed Dec. 22, 1967, entitled EGG GUARD FOR POULTRY CAGES. In the patent referred to, it is disclosed that the toenails or claws of the poultry were causing pinhole damage, particularly the nail or claw on the center toe, which is the longest. More importantly, the pinhole damage was occurring when the birds, while standing at the front of the cages to eat or drink, involuntarily raised one foot or the other to tray to perch it on the egg guard. If no purchase could be found permitting the application of weight on the foot, it would slowly and smoothly be lowered back to the cage floor. Where, on the other hand, the bird was able to find some purchase for its foot, the bird inevitably applied ever-increasing force to the foot involved, ultimately causing same to lose its grip on the egg guard and strike the floor. Very often, the nails or claws on such foot would strike an egg resting on the floor adjacent the bottom edge of the egg guard, and this would inflict pinhole damage to the egg. The answer to this problem was a revolutionary egg guard having a smoothly rounded convex configuration within the cage. The convex configuration greatly reduced the ability of the bird to exert much weight on the foot resting on the guard. The curved surface tended to afford no purchase for the foot, thus causing the bird to slide the foot smoothly down off the guard. While this recognition greatly reduced the amount of pinhole damage, it has not completely eliminated it.

In addition to the foregoing, commercial egg cages are generally arranged in batteries of cages interconnected in side-by-side fashion. It has been customary to provide an egg guard which extends longitudinally through a plurality of cages. Conventionally, egg guards having an overall length of 8 feet have been utilized. With a cage width of 12 inches, such an egg guard will accommodate and extend through eight cages. If the cage width is 8 inches, the guard will extend through 12 cages. While at first blush it appears desirable to have an egg guard which will accommodate a plurality of cages, prior existing egg guards have been subject to damage requiring replacement.

One reason for this is the fact that prior egg guards known to applicant have all been comprised of sheet metal, normally galvanized steel. The shape of these prior art guards has always been such that moisture and dirt collect in certain areas resulting in ultimate corrosion of these areas. Also, in keeping with the overall economical requirements of cage construction, the thickness of the sheet metal has been insufficient to prevent ultimate damage from the birds as they grow within the cages. Many times, only a particular section of the guard is damaged or corroded within one particular cage. However, in order to utilize that cage, the guard therein required repair or replacement. Many times, this results in the replacement of a guard for eight or 12 cages when in effect, the operation of only one cage was concerned. Due to the frequency of repair and replacement required, the existing practice has proven to be uneconomical in the field. In addition, existing structures have proven to be somewhat complex in the way that they are attached to the cages, thus creating difficulties in removing and replacing them. One particular drawback has been the requirement of mechanical fasteners. Not only have labor costs involved been unacceptable, the amount of down time required has likewise been unacceptable.

Thus, there is a need in this art for a new and improved egg guard shield which not only prevents outright breakage of the egg but further reduced pinhole damage heretofore present in the prior art. In addition, there is a need for an egg guard having a longer service life and yet less expensive to fabricate. Finally, there is a need for an egg guard which can be independently mounted within each cage and suspended in such a way that the utilization of mechanical fasteners to install or remove the guard is eliminated.

SUMMARY OF INVENTION

In accordance with the present invention, a novel egg guard is provided for a poultry cage of the type having an inclined floor to permit eggs layed thereon to roll down the incline onto an egg collection means positioned adjacent the cage. The side of such a cage facing the egg collection means has a lower margin spaced from the floor to permit the eggs to pass therebeneath onto the collection means. The egg guard is positioned over the spacing to protect eggs positioned therebeneath from injury by poultry within the cage.

In one aspect, the egg guard is comprised of an integrally extruded plastic member, preferably hving a lubricious surface to inhibit perching. In another aspect, each egg guard is independently suspended within a cage by a rod-receiving flange extending longitudinally the length of the guard on its inner surface, said flange providing a support engagement over a wire-like rod extending the length of the cage and connected at each end to the end walls of the cage. In other aspects, the guard may include an upper hook-like margin folded over to form a tongue and groove support engagement with the upper edge of a feeding trough positioned externally of and in front of the cage. Yet another aspect of the present invention provides a shield portion located within the cage which is curved in its entirety as viewed from within the cage and, in addition, defining a reverse curvature devoid of any horizontal surface portions or angular corners whether convex or concave in nature to prevent perching and inhibit the attempt thereof. The shape also inhibits the collection of moisture and dust etc..

The service life of extruded plastic has proven to be surprising. To begin with, it will not corrode. It not only lasts longer, it is less subject to being deformed. Cost-wise, it has proven superior to metal guards of the type conventionally in use today. The unique suspension of the guard without requiring some type of mechanical fastener greatly reduces the installation time. Also, by providing individual guards for each cage, replacement problems are greatly simplified. Of equal importance, the unique reverse curvature of the shield portion of the guard within the cage almost totally prevents a bird from obtaining any purchase permitting it to apply weight on the foot.

DESCRIPTION OF THE DRAWINGS

FIG. 1 is a fragmentary perspective view of poultry cages embodying the egg guard of the invention;

FIG. 2 is a perspective view showing the underside of the egg guard; and

FIG. 3 is a fragmentary end view in elevation showing the curvature of the egg guard.

DESCRIPTION OF THE PREFERRED EMBODIMENT

As illustrated in the drawings, the basic conventional arrangement for poultry confinement cages of the type with which the egg guard of this invention is concerned is to have a pair of elongated cage structures as seen at 10 and 12, each comprising a series of laterally adjacent and interconnected segments forming individual cages. The two elongated cage structures are arranged in a mutually spaced manner and are generally held in an elevated position by conventional mounting means not shown. In the space 14 between the two cage structures, a feeder trough 15 is normally mounted, from which the birds within the cages take feed. As will be understood, feeder trough 15 normally forms a part of an automated feeding system, in which a flat conveyor chain or the like moves within the trough to transfer feed along its length. Also, a watering trough arrangement (not shown) is often mounted between the cages, usually above the feed trough.

As illustrated, the walls and floor of cage structures 10 and 12 are formed from mutually intersecting wire rods defining a mesh or open construction. The floor portion 16 of each of the cage structures slopes downwardly toward the side 18 of the cages which is closest to the other row of cages in the two spaced cage structures (i.e., the "front" side). In the embodiment shown, the floor of the entire double cage structure is an integral unitary member having a broad V-shaped configuration, there being an interconnecting portion 20 which bridges the floor portions 16 of each cage. A movable conveyor member 22, preferably a belt of jute or the like, rides upon this central or interconnecting floor portion 20. Interconnecting floor portion 20 preferably forms a depression for receiving and guiding belt 22.

The front side 18 of each of the two cage structures terminates above the floor portion 16 thereof in substantial vertical alignment with an edge of the conveyor belt-guiding floor portion 20. The termination above floor portion 16 leaves an opening 24 (FIG. 3) extending longitudinally the length of each cage between front side 18 and floor portion 16. This arrangement is such that eggs layed inside the cages will roll down the inclined floor portion 16, through opening 24 and onto belt 22. Belt 22 is operated periodically and automatically conveys the eggs to a central place of collection.

The novel egg guard 30 of the invention extends longitudinally lengthwise along each cage structure to shield and partially cover opening 24 at the juncture of front side 18 and floor portion 16, i.e., along the projected intersection of front side 18 and floor 16. Referring to FIG. 3, a very important part of guard 30 is its smoothly curved skirt-like shield portion 32 which extends inside the cages and partially across the corner where the front and bottom of the cages would meet or adjoin each other if extended. The curved shield portion 32 is preferably entirely devoid of any angular corner, whether convex or concave in nature. The upper margin 34 of guard 30 extends inwardly of front side 18 while its lower margin 36 terminates within the cage in a spaced relationship from floor 16 defining a space 38 extending essentially the length of each cage. Spacing 38 is of sufficient height to permit an egg layed on the cage floor to pass thereunder toward conveyor belt 22. Due to the slope of floor 16, an egg unless physically obstructed will roll by gravity down the incline.

In accordance with a preferred aspect of this invention, each guard 30 is independently mounted within an individual cage portion of the elongated cage structures 10 or 12. This permits singular insertion and/or removal for repair and replacement. Also, an important aspect of each guard is the fact that it is suspended above floor 16 in a novel fashion which greatly facilitates both rapid and secure mounting so as to reduce any tendency to be damaged by the birds within the cage.

The upper margin 34 of guard 30 includes a lip 40 (FIG. 3) which is in effect folded over and back toward the lower margin to form a generally V-shaped groove or channel 42. Guard 30 is designed to be suspended along its upper margin by feed trough 15 without necessitating the utilization of mechanical fasteners. Trough 15 as shown in the drawings is generally U-shaped, having a pair of upstanding side walls 44 with top edges 46. Lip 40 of the egg guard, by virtue of the channel 42 which it defines, forms a tongue and groove fit over the upper margin 46 of the feeder trough so that in effect, guard 30 is suspended upon the feed trough. As illustrated, the upper edge 46 of side 44 is hook-shaped so that when lip 40 is hooked over the upper margin 46 (as shown in FIG. 3) relative vertical displacement between shield 30 and trough 46 is prevented.

In the embodiment illustrated, it is also desirable to support guard 30 at a position below its upper margin to provide a stable guard which does not exert an undue amount of force or moment on lip 40 in the event a bird jumps or is pushed directly onto the medial portion of the shield. The underside 48 (FIG. 2) of guard 30 thus includes a pair of generally vertically spaced flange portions 50 and 52 projection from surface 48 toward egg collecting belt 22. Flanges 50 and 52 are spaced apart to receive a wire-like rod support 54 which extends the entire length of a cage and is connected to each end wall by hook portions on each outer end of rod 54. Spaced flanges 50 and 52 act as a keeper to prevent downward or lateral displacement of the mid portion of guard 30 with rod 54 positioned between the flanges. As illustrated, flanges 50 and 52 converge at least slightly toward each other. In a preferred aspect, the spacing between the outer free ends of flanges 50 and 52 is less than the cross-sectional diameter of rod 54. However, flanges 50 and 52 are at least somewhat flexible to permit wedged insertion and removal of rod 54 from the channel formed by the two flanges.

In this fashion, movement by the poultry within the cage cannot accidentally cause guard 30 to be dislodged from support rod 54. By positioning rod 54 inwardly from the front side 18 of a cage, guard 30 is totally suspended at two distinct linear supports to reduce any moment arm which might be developed should a bird fall or jump onto the guard. In addition, contact by the birds within the cage is not harmful to guard 30 since it has a solid support near both its upper and lower portions and along the entire length of the guard.

Preferably, guard 30 is comprised completely of plastic. This completely eliminates previous difficulties arising from corrosion. Economically, it has been found extremely advantageous to form guard 30 by extrusion from plastic such as polyvinyl chloride. In addition to the overall shape and cross-sectional configuration of guard 30 which will be described in detail hereinafter, manufacture of which is greatly facilitated by integral extrusion of plastics such as polyvinyl chloride provide a surface which has the characteristic of being lubricous. This by itself makes it difficult for a bird within the cage to get a firm purchase on the guard in attempting to roost upon the latter, and an egg guard having such a surface is by itself regarded as an important feature of the invention, within the broader aspects thereof.

The bottom margin 36 of egg guard 30 is attached to floor 16 of the cage at spaced intervals, preferably through the use of hook-like wire members 56 extending through holes 38 (FIG. 2) formed along the bottom of skirt portion 32 and passing around some of the rods forming the mesh-like floor portion 18 (FIGS. 1 and 3). The lengthwise spacing between each hook member 56 is sufficient to permit an gg to pass therebetween although this spacing will prevent a bird from wedging its way under guard 30. This is a particular problem in a crowded cage wherein one of the birds dies. Due to the incline of bottom 16, without some type of means such as hooks 56, a bird can become wedged beneath guard 30 with the possibility that some portion thereof might extend out over belt 22 causing great damage during its operational period.

The portion of egg guard 30 having the principal function in shielding the egg collection area from the birds within the cage is primarily the skirt-like shield portion 32. Broadly speaking, this portion comprises essentially the entire guard except for the upper margin 34 which includes lip 40, described above. Shield portion 32 is a curved skirt which is entirely devoid of any angular corners. When viewed from within the cage, it is curved in its entirety and in reality describes three different curvature areas, including a reverse curvature disposed between a convex upper shield portion 60 and a convex lower shield portion 62. The reverse curvature or concave portion is designed to both absolutely prevent a bird from obtaining a purchase on the shield as well as prevent it from applying a substantial force through one of its feet after having lifted the foot up onto the shield. Regardless of whether the bird can obtain a purchase or not, pinhole damage can be caused by the simple magnitude of velocity with which the foot of a bird comes off the shield as it applies its weight to it. The unique curvature provided by this invention causes the foot of a bird to immediately start descending, the moment even the slightest positive force is exerted on the foot against the shield. Under these circumstances, the bird will generally lower its foot gently to the floor without ever getting to the point of applying any force to the foot after the initial testing. The unique curvature also greatly reduces the collection of dirt and moisture etc. in any corners.

The upper shield portion 60 extends from upper margin 34 slightly inward with respect to the cage and abruptly downwards to a generally vertical configuration. The upper portion flows smoothly into the lower portion at the area of smooth reverse curvature, wherein it again begins curving slightly inward with respect to the cage and thence once more downward to approach or reach the vertical configuration wherein it terminates at its lower margin 36. This unique configuration satisfies two primary objectives of an egg guard shield, which two objectives are not necessarily compatible. Structurally, the egg guard must reach inwardly of the cage with respect to the front wall at least a matter of a few inches if the guard is to provide any suitable area beneath it for sheltering the eggs which collect therebeneath. Furthermore, the height of the egg guard is definitely limited, since it cannot extend above the point of the front wall at which the birds must have free access to obtain food and water through the front wall. The second primary objective is to provide an egg guard which meets these requirements and at the same time prohibits perching and, furthermore, prevents pinhole damage from the causes discussed hereinabove.

The reverse curvature of the present invention permits steep, generally vertical orientation of the guard to permit the birds to come forth easily for feeding and drinking. The second portion then expands generally inward to provide the requisite suitable area beneath it for sheltering the eggs which collect therebeneath, while at the same time curving smoothly downward toward the vertical to prohibit any perching. The reverse curvature discourages the birds from roosting or attempting to do so since this eliminates a corner area where a slight amount of purchase might be obtained and provides instead a smooth curve which does not at all facilitate grasping or claw purchase, particularly where a lubricious plastic surface is also provided, as in a preferred embodiment of the invention, or where the entire egg guard is integrally molded of plastic, as in the most preferred embodiment. The resultant shield is entirely devoid of any angular corners and in fact is devoid of any surface throughout its entirety which is not at some angle with respect to the horizontal. Furthermore, the lubricity of the plastic from which the guard is preferably made or at least coated, also acts as a deterrent to roosting attempts. As a result, when the birds lift one of their feet and attempt to rest it upon the guard, the foot immediately slips downward and off the guard as soon as the bird relaxes his leg. Should the bird apply any weight to the foot, there is not enough of a foothold to arrest the foot, so that it immediately slips downward. The preferred construction of guard 30 as noted earlier is an extruded plastic such as polyvinyl chloride which has a generally lubricious surface. This feature not only facilitates non-roosting, but the plastic construction, although generally rigid, is still resilient enough to accommodate the most violent contact by the birds without permanent deformation, thus greatly increasing serivce life to the point of virtual indestructability.

Although but one embodiment has been shown and described in detail, it will be apparent to those having ordinary skill in this art that the details of construction of this particular embodiment may be modified in a great many ways without departing from the unique concepts presented. It is therefore intended that the invention be limited only by the scope of the appended claims rather than by particular details of construction shown.

The embodiments of the invention in which an exclusive property or privilege is claimed are defined as follows:

1. In a poultry cage having an inclined floor; a side; the lower margin of said side spaced from said floor to permit eggs to pass beneath said side onto an egg collection means; and an egg guard means positioned over said spacing to protect eggs positioned therebeneath from injury by poultry within the cage, said egg guard means having shield portions located within said cage above and laterally of said opening, the improvement comprising: said shield portions being curved substantially in their entirety as viewed from within the cage and defining a continuous smooth reverse curvature having an upper convexly curved portion extending generally inwardly and downwardly of the cage, a lower convexly curved portion also extending inwardly and downwardly, and a mid-portion of concave curvature bridging said upper and lower curved portions, the transition between said upper, mid and lower portions being smooth and void of any horizontal or vertical surface portions forming corners on which the poultry may perch and such continuous and smooth curvature reducing and inhibiting the collection of dirt and foreign matter, thereby providing a cleaner and more sanitary cage environment, said egg guard means being suspended above said floor and supported at its upper margin by support means outside said cage and further supported at said shield portions by means within said cage, and said shield portions including a flange extending from the underside of said shield portions for engagement with said support means within said cage.

2. The improvement according to claim 1 wherein all parts of said curved shield portions extend downwardly at some inclined angle to the horizontal.

3. The improvement according to claim 1 wherein said egg guard means is comprised of a one-piece integrally shaped plastic member.

4. The improvement according to claim 3 wherein said one-piece plastic egg guard member extends longitudinally between opposite walls of said cage and is resilient.

5. The improvement according to claim 1 wherein said support means outside said cage is comprised of the upper edge of one side of a feed trough positioned above said egg collection means, said upper margin of said egg guard means including a downwardly turned flange for engaging said upper edge of said feed trough.

6. In a poultry cage having an inclined floor; a side; the lower margin of said side spaced from said floor to permit eggs to pass beneath said side onto an egg collection means; and egg guard means positioned over said spacing to protect eggs positioned therebeneath from injury by poultry within the cage, said egg guard means having shield portions located within said cage above and laterally of said opening, the improvement comprising: said egg guard means being suspended above said floor and supported at its upper margin by support means outside said cage and further supported at said shield portions by means within said cage, said shield portions including a flange extending from the underside of said shield portions for engagement with said support means within said cage, said support means within said cage being comprised of a wire-like rod connected at each end to opposite walls of said cage for abutment beneath said flange.

7. The improvement according to claim 6 wherein said shield portions include a pair of said flanges in mutually spaced relation for capturing said wire support between said flanges.

8. The improvement according to claim 7 wherein said pair of flanges converge toward each other and are spaced at their outer ends a distance less than the diameter of said wire support, said flanges being at least somewhat flexible to permit said wire support to be wedged between said outer ends for positive capture between said flanges.

9. In a poultry cage having an inclined floor; a side; the lower margin of said side spaced from said floor to permit eggs to pass beneath said side onto an egg collection means; and an egg guard means positioned over said spacing to protect eggs positioned therebeneath from injury by poultry within the cage, said egg guard means having shield portions located within said cage above and laterally of said opening, the improvement comprising: first support means outside said cage for engaging the upper margin of said egg guard means to suspend the same above said floor, and second support means within said cage for engaging said shield portions to vertically and laterally support said egg guard means, said shield portions including one or more projecting flanges defining a keeper engageable with said second support means within said cage, said flanges defining said keeper projecting from the underside of said egg guard means toward said egg collection means.

10. The improvement according to claim 9 wherein said egg guard means is elongated and extends between the opposite walls of said cage, said one or more flanges being elongated in nature and extending longitudinally of said egg guard means between said cage walls.

11. The improvement according to claim 10 wherein said support means within said cage is comprised of a rod-like member extending between said walls and connected at each end to said walls, said member being positioned beneath one of said keeper flanges to support said shield portion of said egg guard means.

12. The improvement according to claim 11 wherein said keeper includes a pair of flanges spaced from each other for straddling said support wire therebetween.

13. The improvement according to claim 12 wherein said support wire forms a wedge fit between said keeper flanges.

14. In a poultry cage having an inclined floor; a side; the lower margin of said side spaced from said floor to permit eggs to pass beneath said side onto an egg collection means; and an egg guard means positioned over said spacing to protect eggs positioned therebeneath from injury by poultry within the cage, said egg guard means having shield portions located within said cage above and laterally of said opening, the improvement comprising: first support means outside said cage for engaging the upper margin of said egg guard means, and second support means within said cage and spaced inwardly from said first support means for engaging the underside of one of said shield portions, the upper margin of said egg guard means including hooking portions defining an upper keeper for hooking engagement at least partially under portions of said first support means outside said cage to thereby prevent vertical displacement of said egg guard means.

15. The improvement according to claim 14 wherein said support means outside said cage is comprised of the upper edge of one side of a feeding trough, said upper edge having a flange formed therealong, said hooking portions comprising a downwardly curved lip extending the length of said egg guard means, said lip and flange mating together only after relative rotation between said egg guard means and feeding trough whereby disengagement of said egg guard means from said feeding trough is prevented through movement in a single plane.

16. The improvement according to claim 15 wherein said egg guard means is elongated and extends between the opposite walls of said cage, said lip having an elongated flange extending inwardly along the terminal edge of said lip.

17. In a poultry cage having an inclined floor; a side; the lower margin of said side spaced from said floor to permit eggs to pass beneath said side onto an egg collection means; and an egg guard means positioned over said spacing to protect eggs positioned therebeneath from injury by poultry within the cage, said egg guard means having shield portions located within said cage above and laterally of said opening, the improvement comprising: a protrusion means mounted on the underside of said egg guard means for supportive engagement with support means positioned within said cage and spaced inwardly from said side.

18. The improvement according to claim 17 wherein said support means includes an elongated member supported at each end by opposite walls of said cage, said member being positioned beneath said protrusion means to engage the latter above said cage floor.

19. The improvement according to claim 18 wherein said protrusion means includes a pair of spaced wall surfaces defining a support channel therebetween for receipt of said elongated member.

20. The improvement according to claim 19 wherein said egg guard means is comprised of a one-piece plastic member defining said protrusion means integrally therewith.

21. An egg guard for mounting generally within a poultry cage to protect eggs from injury by poultry within the cage, said guard comprising an elongated member of generally curving convex configurations as viewed from within the cage and having an upper margin shaped to define a downwardly opening lip for receiving a first support element suspending the upper margin of said guard therefrom, and a protrusion means mounted on the underside of said guard spaced from said lip for receipt of a second support element for supporting the remainder of said guard.

22. The egg guard according to claim 21 wherein said first support element has a nonvertical configuration forming a tongue and groove fit with said lip such that when said first support element is inserted into said lip, vertical separation of said guard and first support element is prevented unless at least one of said guard and first support element is moved laterally relative to the other.

23. In a poultry cage having an inclined floor; a side; the lower margin of said side spaced from said floor to permit eggs to pass beneath said side onto an egg collection means; and an egg guard means positioned over said spacing to protect eggs positioned therebeneath from injury by poultry within the cage, said egg guard means having shield portions located within said cage above and laterally of said opening, the improvement wherein at least those portions of said egg guard means which are exposed within the cage and accessible to the poultry therein have a lubricious plastic surface whereby said surface acts as a deterrent to the roosting and perching of poultry as well as reducing and inhibiting the collection of dirt and foreign matter to help provide a cleaner and more sanitary cage environment.

24. The improvement according to claim 23, wherein substantially all portions of said egg guard are of material having a lubricious plastic surface.

25. The improvement according to claim 24, wherein said egg guard is a one piece member formed integrally of plastic material.

26. The egg guard according to claim 21 wherein said protrusion means comprises a pair of spaced flanges extending inwardly forming a channel, said second support element being rod-like an fitting into said channel.

27. The egg guard according to claim 26 wherein said spaced flanges are inclined inwardly toward each other and resilient forming a lock for said rod-like second support element.

28. The egg guard according to claim 21 wherein said egg guard is comprised of a flexible plastic.

* * * * *